Dec. 9, 1969     D. B. HEASLIP ET AL     3,483,385
APPARATUS FOR COMPARING THE SURFACE REFLECTIVITY OF MATERIALS
Filed May 9, 1966     4 Sheets-Sheet 1
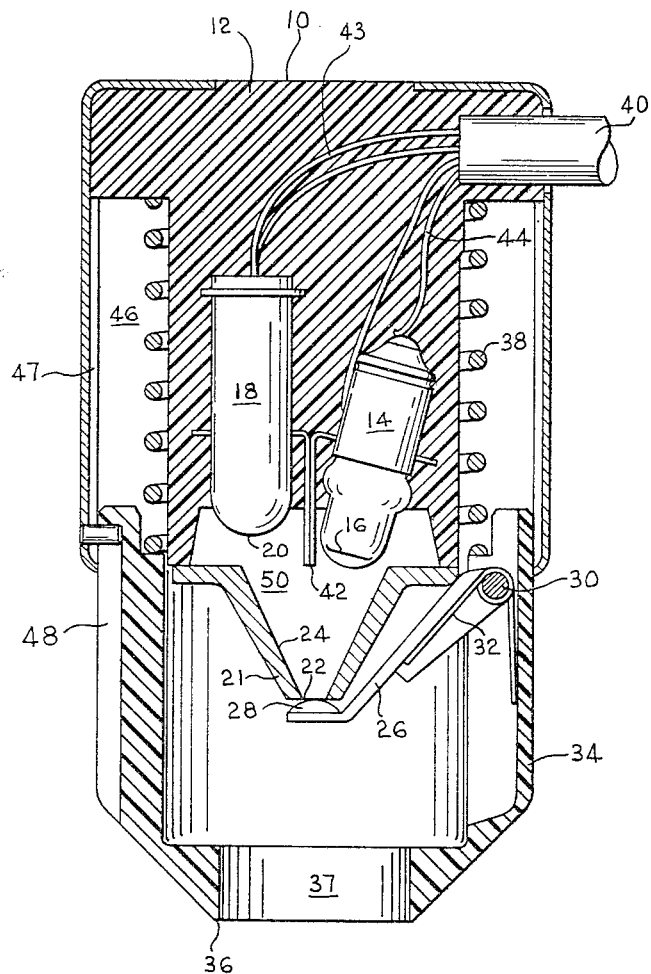
FIG. 1
RICHARD J. LEWIS
DONALD B. HEASLIP
INVENTORS.
ATTORNEY

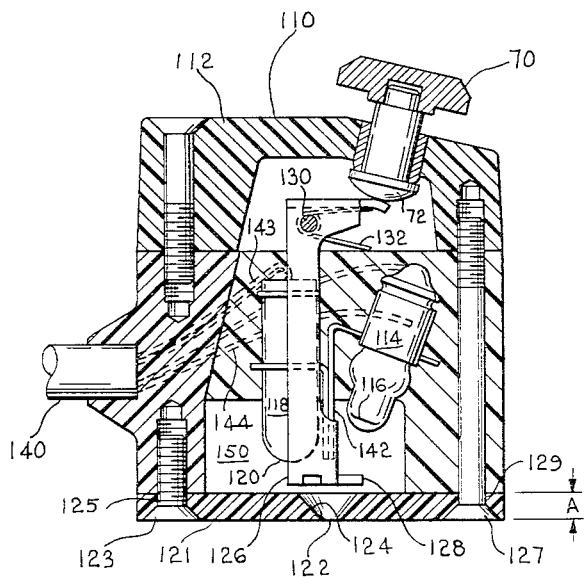
FIG. 4
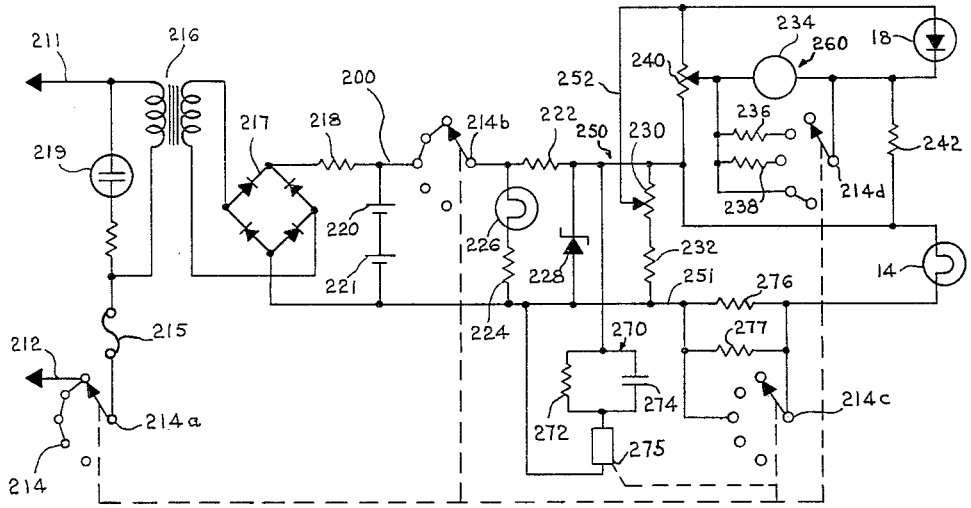
FIG. 5
RICHARD J. LEWIS
DONALD B. HEASLIP
INVENTORS.
ATTORNEY

RICHARD J. LEWIS
DONALD B. HEASLIP
INVENTORS.

United States Patent Office 3,483,385
Patented Dec. 9, 1969

3,483,385
APPARATUS FOR COMPARING THE SURFACE REFLECTIVITY OF MATERIALS
Donald B. Heaslip, Sauquoit, and Richard J. Lewis, New Hartford, N.Y., assignors to The Bendix Corporation, a corporation of Delaware
Filed May 9, 1966, Ser. No. 548,698
Int. Cl. H01j 39/12
U.S. Cl. 250—210                                21 Claims

ABSTRACT OF THE DISCLOSURE

A device for precisely measuring the reflectivity of surfaces by comparing the reflectivity of a surface to a standard reflecting surface. The disclosure includes a focused light source, a light sensor for receiving the focused light reflected from a surface, and a standard reflecting surface all encapsulated in a molded head. The electrical circuitry for precisely measuring the amount of light reflected from a surface includes a measuring bridge, a regulator circuit to precisely control the power supplied to both the measuring bridge and the focused light source, and an electrical network for enabling accurate measurements to be made by maintaining the light sensor at a preselected temperature while reflection measurements are being made.

---

The present invention relates to a device for precisely comparing the reflectivity of materials and, more particular, to a device for precisely comparing the reflectivity of materials which have a focused light source and a light sensitive member encapsulated in a molded head.

In a modern industrial society there are many occasions when the degree of polish or mirror finish of an article is highly important as, for example, in establishing that various finishing operations such as lapping, tumbling and bright dipping have been performed according to specification. Surfaces to be so examined may have many shapes and forms. They may be spherical, cylindrical or otherwise having a curved surface or irregularly shaped surfaces. A surface reflection comparator of the type to be described may, for example, be used to determine the finish of ball and roller bearings, hydraulic pump torque and thrust plates, flexible coupling diaphragms, carbon seals and carbon sealed mating surfaces, and to detect grind burns. A surface reflection comparator of the type to be described may be used to determine the surface finishes as reflectivity of any material including, but not limited to, metal, wood, glass, plastic, paper and other wood pulp derivatives, colloid, solution, animal skin or fur and many others. Still further, a surface reflection comparator of the type to be described may be used to determine the uniformity or quality of curvature of the surface, the stress on the surface, small amplitude movements of the surface, gas or liquid contamination, and even to detect cracks or other defects in closed pipes.

It is an object of the present invention to provide a surface reflection comparator which can read surface reflectivity of convex and concave surfaces with equal accuracy.

It is an object of the present invention to provide a surface reflection comparator which is adapted to determine the reflectivity of the surface independently of the shape or curvature of the surface.

It is an object of the present invention to provide a surface reflection comparator which has a built-in comparison standard.

It is an object of the present invention to provide a surface reflector comparator which has a built-in comparison standard which is continuously being monitored on the reading device or meter when a comparison reading is not being taken.

It is a further object of the present invention to provide a surface reflection comparator which has quick warm up features so that it may be ready for operation in significantly less time than curerntly known devices.

It is a still further object of the present invention to provide a surface reflection comparator having an aligning member for properly orienting the light source and the light sensing member to the surface whose reflectivity is to be determined.

It is a further object of the present invention to provide a surface reflection comparator having a molded head encapsulating the light source and the light sensitive member.

It is a still further object of the present invention to provide a surface reflection comparator employing a focused light source.

It is a further object of the present invention to provide surface reflection comparator employing a portable electrical power supply so that the device is usable in places where electrical power is not otherwise available.

It is a further object of the present invention to provide a novel combination of a photo conductive cell and electrical circuitry to provide a highly sensitive reflectivity measuring circuit and, more particularly, a highly accurate zero reading.

It is a further object of the present invention to provide a surface reflection comparator which senses an electromagnetic radiation spectrum substantially similar to that sensed by the human eye.

It is a still object of the present invention to provide a surface reflection comparator employing a focused light source disposed at an oblique angle to a light sensitive member which has a light sensitive aera larger than the area of the reflected focused light beam.

The foregoing and other additional objects and advantages of the present invention will appear more fully hereafter from a consideration of the detailed description which follows, taken together with the accompanying drawings wherein embodiments of the present invention are illustrated. It is to be expressly understood, however, that the drawings are for the purpose of illustration and description and are not to be construed as to defining the limits of the invention.

FIGURE 1 shows an embodiment of the present invention having a movable alignment head;

FIGURE 4 shows a second embodiment of the present invention;

FIGURE 5 shows an electrical circuit which may be used in conjunction with the embodiments shown in FIGURES 1, 4, 6 and 7 of the present invention and which provides a quick warm-up circuit for the present invention and an accurate zero reflectivity reference;

Figure 2:
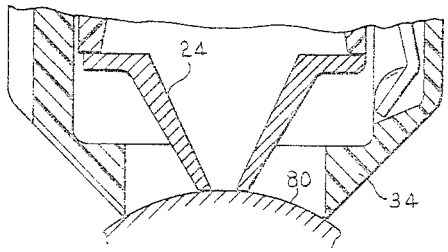
FIGURE 2 shows a fragmentary view of the embodiment of the present invention shown in FIGURE 1 measuring the reflectivity of a convex surface.

Turning now to FIGURE 1, numeral 10 indicates generally a surface reflection comparator sensing head having a molded housing 12 which is formed of a moldable material, typically an epoxy or other type of plastic and which encloses a light source 14 which has a lens 16 to produce a focused light beam and a light sensing member 18 which has a receiving surface 20 which is dimensioned to be larger than the width of the reflected beam at the sensing surface. The sensing head has a conical-shaped member 21 with an aperture 22 for permitting light to escape from the head and for providing a return for the reflected light to be sensed by the sensing member 18. The conical member 21 has an obliquely-inclined inner surface 24 which reflects stray light from the light source 14 away from the light sensing member 18 and sensing surface 20. A reflector member 26 has a reflecting surface 28 rotatably mounted about a pivot end 30 which is spring biased 32 to normally prevent light from leaving the module head 12. This ararngement provides a built-in standard reference once the reflecting surface 28 is calibrated against a known standard.

An alignment member 34 has a telescoping or sliding connection with the housing 12 which is provided by a slot 46 formed in the housing and splines 47 and 48 in the housing and in the aligning member, respectively, which provide the sliding fit. A resilient member, normally a coil spring 38, biases the alignment member 34 in a fully extended position with respect to the sensing head 12. An aperture 37 formed in the alignment head 34 has a contoured lip 36 for forming a close fit to the surface to be measured. In the embodiment shown in FIGURE 1, the lip contour 36 is circular so that spherical surfaces or other generally curved surfaces may be read. The contour 36 might be formed to adapt to a cylindrical surface and that alteration would not require the exercise of further invention. The alignment head 34 may also be made of a moldable material such as an epoxy.

It can be clearly understood that when the molded head is formed, a space 50 will be left so that light may escape from the head and return to the light sensing member 18. Further, when the encapsulation of the light source and light sensing member occurs, the electrical cable 40 which carries the conductors 43 and 44 for supplying power to the light sensing member 18 and the light source 14, respectively, are already connected. A baffle member 42 is disposed in the housing intermediate of the light source 14 and the light sensing member 18 to further restrict stray light from the light source being sent by the light sensing member. It can be appreciated that the baffle 42 acts in cooperation with the oblique surface 24 to prevent stray light from reaching the light sensing member. In addition the baffle is operative to hold the light source and the light sensing member in position during molding of the head.

Figure 3:
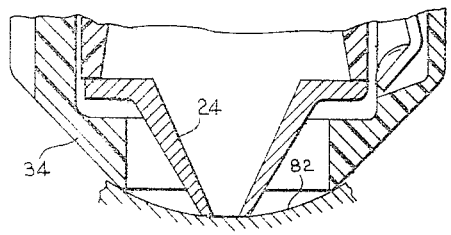
FIGURE 3 shows a fragmentary view of the embodiment of the present invention shown in FIGURE 1 measuring the reflectivity of a concave surface.

As shown in FIGURES 2 and 3, when the surface reflection comparator is used to read spherical surfaces, either concave or convex ones, the aligning member 34 is in a retracted position with respect to the sensing head 12 and the alignment lip contour 36 grips the surface to be compared, thereby aligning the light source 14 with respect to the surface to be read and insuring that the reflected light will be directed to the light sensing member 18. It can be seen that the reflector member 28 is automatically drawn out of its normally blocking position to permit light to leave the housing and return to it merely by telescoping the alignment member 34 into its retracted position. It can further be seen that although the difference in surface between the convex surface 80, shown in FIGURE 2, and the concave surface 82, shown in FIGURE 3, may cause some slight difference in focusing of the beam on the sensing head 18, since the sensing head receiving surface 20 is larger than that of the reflected focused beam, that the slight difference in focusing will not affect the accuracy of the reading of the present invention. Furthermore, the use of a focused beam further tends to reduce the effects due to the different shapes of the surfaces measured. This operation may be considered similar to performing a measurement on an infinitesimal part of the surface.

Turning now to FIGURE 4 wherein a second embodiment of the present invention is shown, like parts will be indicated by like numerals in the hundred series without further explanation. Thus, the light source which is shown in FIGURE 1 by numeral 14 is designated in FIGURE 4 as number 114. In the embodiment shown in FIGURE 4, the reflector member 126 is mounted internally in the housing member 112 instead of intermediate the housing member and the aligning member as shown in FIGURE 1. To retract the reflector member 126 with its reflecting surface 128, a button 70 having a contact surface 72 maintains contact with a portion of the reflector member arm and when pressed, will retract the reflector member from its normal position, permitting light to leave the light sensing head 112. A spring 132 normally biases the reflector member 126 in a position to block the aperture 122.

In the embodiment shown in FIGURE 4, the base member 121 of the molded head 112 is formed separately for attachment by bolts 123 and 127 which fit through holes 125 and 129 in the base member 121. The aperture 122 formed in base member 121 has a thickness of "A" millimeters.

Figure 6:
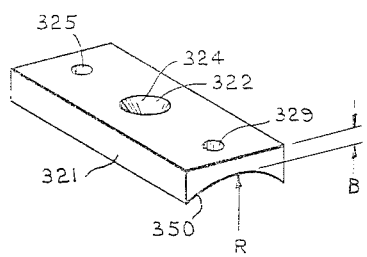
FIGURES 6 and 7 show third and fourth embodiments of the sensing head is adapted for reading the surface reflectivity of cylindrical shapes.
Figure 7:
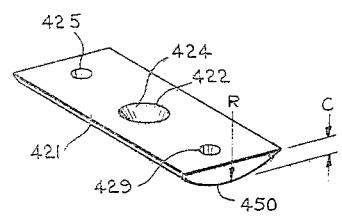

Turning now to FIGURES 6 and 7 which show additional embodiments of the base portion 121 of FIGURE 4. In FIGURES 6 and 7 like portions of the base member 121 will be indicated by like numerals in the three hundred (300) and four hundred (400) series respectively without further explanation. Member or base plate 321, shown in FIGURE 6, has a concave exterior surface 350 which has a minimum thickness at the aperture of "B" millimeters and a radius of curvature of "R" millimeters. Base plate 421 has a convex exterior surface 450 which has a maximum thickness of "C" millimeters and a radius of curvatures of "R" millimeters.

When base 321 is attached to sensing head 112, the surface reflection comparator may more accurately read the surface reflectivity of the outer surface of cylindrical shapes. In a like manner, when base 421 is attached to sensing head 112, the surface reflection comparator may more accurately read the surface reflectivity of the inner surface of cylindrical shapes.

To promote accuracy, comparability and repeatability of surface reflectivity measurement, the thickness of the respective base plates 121, 321 and 421 at the aperture should be substantially equal. That is for best performance upon interchange of base plates, thicknesses "A," "B" and "C" should be substantially equal to each other.

It should be understood that although the base plates 121, 321 and 421 are shown as separate members that they could as well be molded as an integral part of the molded head. Showing the base plates as separate members permits interchangeability of parts and permits the single surface reflection comparator sensing head to have a wider range of use on varying surface contours. Radius "R" shown in FIGURES 6 and 7 may have essentially any value. The base plates may have shapes other than the flat or cylindrical surfaces shown in FIGURES 4, 6 and 7.

Turning now to the circuitry for the surface reflection comparator shown in FIGURE 5, lead wires 211 and 212 lead to a transformer member 216 through a switch 214 which has four switching actions or wafers 214a, 214b, 214c and 214d. Transformer member 216 is connected in series with a fuse member 215 to protect the circuit. A pilot light 219 is in parallel with the primary side of the transformer to show when the circuit is receiving power. A full wave rectifier 217 is shown as a four diode rectifier. The rectifier is connected to the secondary side of the transformer 216 to provide charging power for the rechargeable battery members 220 and 221 which are in series relationship with each other and themselves in parallel with the full wave rectifier member 217. The resistor member 218 is disposed intermediate the full wave rectifier 217 and the rechargeable batteries 220 and 221 to provide a charging current limit for the rechargeable batteries 220 and 221. A light bulb member 226 and a resistor member 224 are disposed in electrical series relationship relative to each other and are themselves in parallel with the rechargeable battery members 220 and 221. The switch wafer 214b is disposed intermediate the battery members and the light member 226. The light member 226 serves to show when the power is being supplied to the portion of the circuit other than the battery members 220 and 221. A voltage stabilization member 228 which is shown as a Zener diode member is disposed in parallel with the voltage source of the battery members and in parallel with the light bulb member 226 and the resistor member 224. A resistor member 222 may be interposed between the light bulb 226 and the voltage stabilization member 228 for additional source stability.

A voltage divider network 250 has a first arm or branch 251 connected to the light source member 14 and to the voltage stabilization member 228. A second branch of the voltage divider network 252 interconnects the voltage stabilization member 228 to the light sensing member 18, or 118 as the case may be, an to a current detecting member 234 which is disposed to detect the varying electrical properties of the light sensing member 18. The measuring network, shown generally by the numeral 260 is interconnected to the voltage stabilization member 228 by the second branch 252 of said voltage divider network. Bridge network 260 consists of four arms, one of which is made up of the light sensing member 18 and another arm is made up of one portion of the variable resistor member 240. A third arm of the bridge network is composed of the other portion of the variable resistor member 240 and a fourth arm formed by a fixed resistor member 242. A current detecting member or galvanometer member 234 is disposed across the arms of the bridge member 260.

The bridge member 260 is normally adjusted so that no current flows through the galvanometer or ammeter member 234 when no light is sensed by the light sensing member 18. The bridge network 260 is one that provides an exceedingly accurate null reading or zero reflectivity reading for the surface reflection comparator. A plurality of resistor members 236 and 238 are disposed for being switched in parallel with the detecting device 234 to change the sensitivity of the current detecting member 234 so that different scales of reflectivity may be detected. A variable resistor 230 and fixed resistor 232 control the relative amount of power supplied to the bridge network member 260. The variable resistor member 240, of course, serves to balance the bridge network 260.

An automatic timing and switching network, shown generally by the numeral 270, may be connected relative to the voltage stabilization device 228 to provide an automatic warm-up and switching feature for the surface reflection comparator. The warm-up feature has significant utility whether switching is performed automatically or mechanically. To achieve this function, a plurality of resistors 276 and 277 may be connected in the branch of the voltage divider network 251 which is connected to the light source member 14. A resistor member 272 and a capacitor member 274 may be connected in parallel with each other and in series relationship with a relay member which may be a transistor or a solenoid member 275. The series-parallel combination of the resistor member and the capacitor member and the relay member is then connected in parallel with the Zener diode or voltage stabilization member 228. When the capacitor member 274 has reached a fully charged state, there is insufficient current to hold the relay member 275 in a closed position and it will be biased to open, thereby allowing current to flow through the resistor members 276 and 277. This action of course reduces the supply of power to the light source. When the light source member 14 is receiving additional power, the resistor members 276 and 277 are switched out of the circuit by the switch 275. The additional light produced by the light source will be allowed to strike the reflector member 28 or 128 as the case may be and the additional light will be received by the light sensing member 18 or 188 as the case may be, thus providing it with additional current flow to bring it to a normal operating state more quickly. The capacitor member 274 and the resistor member 272 may be so chosen with respect to the relay 275 that the initial charging current through the capacitor and resistors is sufficient to close the switch. However, the resistor 272 preferably may be of a large enough value so that the steady state current through it will not be sufficient to keep the switch 275 in a closed state. When the switching is performed mechanically automatically, switch 275 may be mechanically linked to segment 214c of switch 214 and segment 214c may be mechanically disconnected from the remainder of switch 214.

If the automatic timing and switching network 270 is used, the switch member 214 need only have four positions—namely, an "on" position, and "off" position, and two sensitivity ranges, one of zero to fifty and another of zero to one hundred percent reflectivity. If no automatic timing and switching network 270 is used, a switch 214 would normally have five positions—namely "on," "off," "warm up" and "zero to fifty" and "zero to one hundred percent" reflectivity. In either case, the switch could have an additional position known as the charging position. However, in the assembly shown, provided with the rechargeable battery members 220 and 221, the batteries are constantly recharged as the surface reflection comparator is used. It should be appreciated, of course, that the battery members could be nonrechargeable ones in which case the full wave rectifier of the transformer member and the fuse circuit may be eliminated as well as the wafer of the switch 214b. The circuit shown in FIGURE 5 is shown with the switch positioned in the zero to one hundred percent reflectivity reading and the device in condition for reading surface reflectivity. In addition to switching in and out of resistors 276 and 277, the relay switch member 275 of the automatic timing and switching network is also adapted to switch in and out the detecting member 234.

It can readily be appreciated the foregoing novel circuit achieves its stated objects and provides a number of valuable functional advantages in the present invention. The combination of the bridge network 260 and a light sensing member 18 which has a resistivity which varies as a function of the light sensed by it provides an extremely accurate measuring device circuit far more accurate than one measuring the voltage produced by a photo voltaic cell. No electrical measuring circuit is inherently more accurate than a bridge network. The use of a light sensing member whose resistivity varies as a function of the light sensed by it is the only light sensing member which can advantageously be employed in combination with a bridge network.

Normally, reflective measurements will be taken by feeding the meter 234 which will be directly calibrated in percent of reflectivity. Calibration will be relative to known and recognized standards. However, a calibrated resistor set or a calibrated variable resistor could be used to balance the bridge network 260 at all levels of reflectivity. This method of reflectivity measurement would be less speedy but more accurate. The variable resistor member 240 could be used as the calibrated variable resistor, but a further variable resistor member might have to be added. Such a bridge measuring circuit would be the most accurate circuit achievable. It should be noted that part of the warm-up feature is the use not only of the additional power supplied to the light member, but the coordination of this with the reflecting surface of the comparator to reflect the light to the light sensing member. Thus, protecting the light sensing member from attempts to over-energize it and yet providing a warm-up feature by using its natural properties. When the automatic timing and switching network 270 has completed its warm-up cycle, the light bulb member 226 may, if it is controlled from switch 275, become energized and signal that the warm-up period is over.

It should be noted that light sensitive members 18 and 118 are in the proposed embodiment, photo cells which have electrical properties which vary as a function of the light sensed by them. Photo cells may be photo voltaic cells, photo conductive cells, photo diodes, or photo transistrs, for example. One such type of device which is used in the preferred embodiment of the present invention is of the type whose resistivity decreases as a function of the light sensed by it. In this connection, the ammeter 234 is used to sense the varying current flow in the photo cell 18 or 118 as the case may be.

Figure 8:
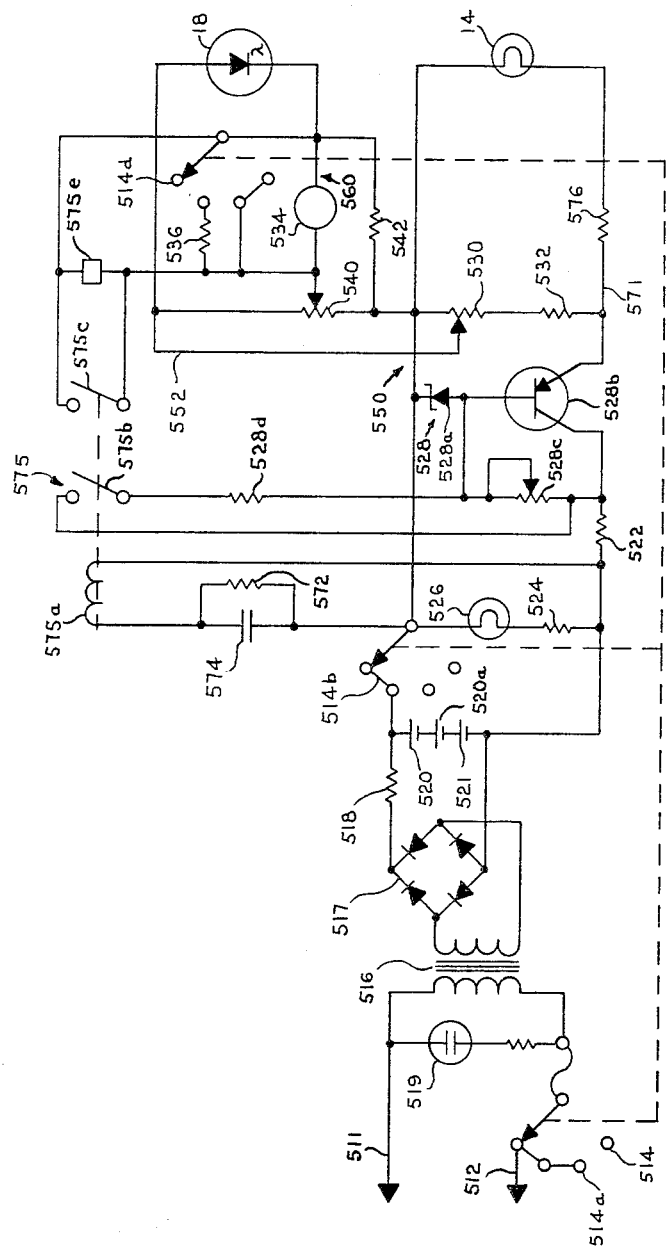
FIGURE 8 shows a second embodiment of the electrical circuit shown in FIGURE 5 which may be used in conjunction with the embodiments shown in FIGURES 1, 4, 6 and 7 of the present invention.

FIGURE 8 is a diagramatic view of a second embodiment of the electrical circuit which may be used in combination with the embodiment surface reflection comparator, shown in FIGURES 1, 4, 6 and 7. Since the circuit shown in FIGURE 8 is similar to the circuit shown in FIGURE 5, like parts will be indicately by like numerals in the five hundred (500) series without any further explanation.

Turning now to FIGURE 8, lead wires 511 and 512 lead to a transformer member 516 through a switch 514 which has three switching actions or wafers 514a, 514b and 514d. The lessened number of switching actions is permissible because of the automatic timing and switching network 575.

This embodiment of the circuit has three batteries 520, 520a and 521 which are shown as rechargeable batteries. The voltage output of the batteries is supplied to an automatic timing and switching network 575 and to a voltage regulation network 528. The voltage regulation network and the automatic timing and switching network are interconnected in a manner which will be described.

A capacitor member 574 and the winding 575a of a relay 575 are connected in series with each other and in parallel with the batteries. A resistor member 572 may be connected in parallel with the capacitor 574. The resistor 572 may be used to alter the charging time of the capacitor 574 and to provide sufficient current to aid initial closure of switch 575, yet now draw sufficient current to prevent switch 575 from opening. Switch 575 may operate two switching actions 575b and 575c.

Switch 575b switches in and out of the voltage regulator circuit resistor 528d which is connected in series with variable resistor 528b. Resistor 528d may be merely representative of the resistance of the lead wires 528f and 528g which effectively short circuit variable resistor 528c when switch 528b is closed. Switch 575c effectively short circuits meter protector 575e which may be placed in parallel with galvanometer or ammeter member 534 to protect the meter member 534 from being driven beyond its operating range.

The basic regulator circuit which includes the zener diode member 528a, the transistor member 528b, and the variable resistor member 528c is a known voltage regulator circuit. In the present invention, however, a variable resistor 528c is used to adjust the color spectrum of the light emitted by light source 14 or 114, as the case may be. Normally, the light source is adjusted to produce light weight in color content to match the color sensitivity of the light sensing member 18 or 118.

When the automatic timing and switch network 575 is on its automatic warm up cycle, switch 575b is held closed by current in winding 575a effectively, short circuiting transistor 528b base and collector leads and driving transistors 528b into or toward saturation. This action permits light source 14 to 114 to achieve a relatively high level output which is reflected by reflective surface 28 or 128 and which causes light sensing member 18 or 118 to operate at a high level, quickly bringing it up to a normal operating point. During this high level of light sensing by sensor 18 and 118, meter 534 is protected from overloading by diode 575e. Meter 534 protection may be accomplished by a circuit which employs the switch 575b to switch a current-limiting resistor (not shown) in and out of series relationship with the bridge voltage supply and the bridge member 560. Such a circuit eliminates the need for a meter protector or diodes 575e.

It can readily be appreciated that the present invention accomplishes its stated objects. It is fully able to compare the surface reflectivity of materials without regard to the surface contour of the material, that is, without favoring as more reflective or less reflective that surface which is either concave or convex or cylindrical. The present invention is thus able to discriminate the surface characteristics of the material whose reflectivity is to be determined from its surface shape. This function is one unknown in the prior art. The present invention achieves this result by the use of a focused light source and by employing a light sensing member which has a light sensing area which is larger than that of the focused beam. Still further, disposing the light source at an oblique angle to the light sensitive member aids in achieving this result by causing the truly reflected light to strike the light sensitive member and the improperly reflected light not to strike the light sensitive member. The alignment head further serves to accurately align the light source and the light sensing member with respect to the material whose reflectivity is to be measured.

A light sensing member having resistivity varying as a function of the light sensed by it has the property of sensing electromagnetic energy of virtually the same frequency and with the same sensitivity as a function of frequency as that of the human eye. Such a light sensing member is a better device for a surface reflection comparator than a photo-voltaic cell used in known devices which has a large portion of its sensitivity in the infrared region and thus is more heat sensitive than the present invention.

The preferred embodiment of the present invention employs a light sensing member and a light source. However, both the source and the sensing member may respectively generate and sense electromagnetic radiation in other than the visible spectrum, such as ultra-violet and infra-red radiations or other frequencies and the terms light sensing member and light source should be so understood. Thus the "light source" might be another source of electromagnetic energy such as a klystron.

Positioning the built-in comparison standard to normally block the aperture of molded head accomplishes two major purposes. First, the light sensing member is kept in a continuously warmed-up state ready for quick and accurate readings without drifting. Second, constant monitoring of the built-in reference advises the operator of the need for any adjustment in the read-out device. Continous monitoring also enables the surface reflection comparators to be readily interchangeable and easily calibrated.

We claim:

1. An apparatus for comparing the surface reflectivity of materials comprising:
   a light source;
   a light sensitive member having electrical properties variable as a function of the light received by it;
   a housing means partially enclosing said light source and said light sensitive member;
   an aperture in said housing means providing a path for the light from the light source to strike a surface, and also providing a path for the light reflected by said surface to strike and be sensed by said light sensing member;
   and a reflector member movably supported by said housing member for blocking said aperture, said reflector member providing a built-in comparison standard.

2. An apparatus for comparing the surface reflectivity of materials comprising:
a light sensitive source;
a light sensitive member having electrical properties variable as a function of the light received by it;
a housing means partially enclosing said light source and said light sensitive member;
an aperture in said housing means providing a portion of a path for the light from said light source to strike a surface, and also providing a portion of a path for the light reflected by said surface to strike and be sensed by said light sensitive member;
said light source being adapted to provide a focused light beam; and
said aperture and said light sensitive member being arranged in said housing such that substantially all light reflected by the material is sensed by the light sensitive member.

3. The apparatus as claimed in claim 2 wherein:
said housing means includes an obliquely inclined inner surface area extending to said aperture.

4. The apparatus as claimed in claim 2 wherein:
said housing means comprises a molded head;
a baffle member is disposed in the housing means between the light source and the light sensitive member;
and said baffle member serves to hold said light source and said light sensing member in position during the molding of said head.

5. The apparatus as claimed in claim 2 wherein:
said light sensitive member has a receiving area larger than the area of the reflected focused beam such that said light sensitive member can receive substantially all of the reflected light from the material to be compared.

6. An apparatus for comparing the surface reflectivity of materials comprising:
a light source;
a light sensitive member;
a housing member enclosing said light source and said light sensitive member;
an aperture in said housing providing an outlet for light from said source and an inlet for light reflected from the material; and
a reflector member movably supported relative to said housing member for normally blocking said aperture, said reflector member providing a comparison standard.

7. The apparatus as claimed in claim 5 with
said reflector member supported on a pivoted rod member; and
resilient means biasing said reflector member to normally close said aperture 8. The apparatus as claimed in claim 6 having
an aligning member having a telescoping connection to said housing member;
said aligning member having a second aperture therein at the end distant from the housing member; and
said second aperture having a periphery formed to accurately align said light source and light sensing member relative to the material to be compared such that the reflectivity of the material is compared without regard to the shape of the material.

9. The apparatus as claimed in claim 8 wherein:
a resilient means biases said aligning member in an extended position relative to said housing member and a retracted position relative to said housing member;
said reflector member is disposed external to said housing member inside of said aligning member; and
said housing member is operative to position said reflector member to open said housing member aperture when said aligning member is in a retracted position to permit light to leave the housing member and return to the light sensitive member.

10. The apparatus as claimed in claim 8 wherein:
the housing member has a slotted splined portion;
the aligning member has a splined portion adapted to mate with the splined portion of the housing member; and
the aligning member is formed of a moldable material.

11. The apparatus as claimed in claim 6 wherein:
said housing member is formed of a moldable material and, said light source and said light sensitive member are molded in place in said moldable housing member.

12. An apparatus for comparing the surface reflectivity of materials comprising: a light source;
a light sensitive member having an electrical resistivity varying as a function of the light received by it;
an electrical source stabilization means;
a voltage divider network having one branch means interconnecting said electrical source stabilization means and said light source;
a current detecting means disposed in said circuit to detect resistivity charges in said light sensitive member;
a second branch means of said voltage divider network interconnecting said current detecting means and said light sensitive member to said electrical source stabilization means; and
said second branch means of the voltage divider network having a variable resistor in connection to the light sensitive member circuit to permit compensation for the leakage current of said light sensitive member.

13. The apparatus as claimed in claim 12 wherein:
said second branch means of said voltage divider network has a plurality of resistors which may be controllably switched into a parallel relationship with said current detecting means and said light sensitive member to change the sensitivity of said current detecting means.

14. The apparatus as claimed in claim 12 wherein:
said second branch means comprises a bridge network having first and second arm means;
said light sensing member disposed in one arm means of said bridge network; and said current detecting means disposed across said arms means of said bridge network.

15. The apparatus as claimed in claim 14 wherein:
said arms of said bridge network are resistively balanced when no light is received by said light sensing member; and
said balance is adjustably achieved.

16. An apparatus for comparing the surface reflectivity of materials comprising:
a light source;
a light sensitive member having electrical properties variable as a function of the light received by it;
an electrical source stabilization means;
a switching network connected relative to said electrical source stabilization means to maintain a potential across said light source during a warm-up phase which differs from a potential maintained across said light source while reflection measurements are being made of surfaces, and
means permitting light from said source light to be substantially, continuously received by said light sensing member during said warm-up phase.

17. The apparatus as claimed in claim 16 wherein:
said switching network comprises
automatic timing and switching means for supplying said warm-up power.

18. The apparatus as claimed in claim 17 wherein:
said switching network automatically provides additional path from said source stabilization means so that said source stabilization means maintains a voltage potential across said light source for a warm-up period that is greater than the voltage maintained across said light source after said warm-up period when reflection measurements are being made.

19. The apparatus as claimed in claim 16 including further:
a resistive capacitor timing network in electrical series relationship with a relay member;
said resistive capacitor timing network and said relay member being in electrical parallel relationship with said voltage stabilization means;
a resistor member adapted to be switched out of said first branch means after said predetermined warm-up time.

20. The apparatus as claimed in claim 12 including further:
battery means supplying power for said light source and said light sensing member.

21. The apparatus as claimed in claim 20 including further:
recharging means for said battery means including a transformer member and a full wave rectifier means;
a timing switching network to provide warm-up power for said light source and said light sensing member; and
indication means to show when said warm-up period is terminated.

References Cited

UNITED STATES PATENTS

| | | | |
|---|---|---|---|
| 2,430,146 | 11/1947 | Shonnard | 250—210 |
| 2,803,161 | 8/1957 | Summerhayes | 88—14 |
| 2,806,401 | 9/1957 | Demuth et al. | 88—14 |
| 3,132,253 | 5/1964 | Sorsen | 250—20 |
| 3,161,039 | 12/1964 | Kapaff | 88—14 |
| 3,039,080 | 6/1962 | King | 250—239 X |
| 3,099,750 | 7/1963 | Swarthout et al. | 250—239 |
| 3,396,281 | 8/1968 | Blackman | 250—239 |

JAMES W. LAWRENCE, Primary Examiner

C. R. CAMPBELL, Assistant Examiner

U.S. Cl. X.R.

250—202, 237, 239; 356—212